(12) United States Patent
Khasgiwala et al.

(10) Patent No.: US 9,628,199 B1
(45) Date of Patent: Apr. 18, 2017

(54) MITIGATING ELECTROMAGNETIC INTERFERENCE AND COMPATIBILITY ISSUES

(71) Applicant: Amazon Technologies, Inc., Seattle, WA (US)

(72) Inventors: Mudit Sunilkumar Khasgiwala, Milpitas, CA (US); Akshay Mohan, Sunnyvale, CA (US); Jagan Vaidyanathan Rajagopalan, San Jose, CA (US); Duck Ho Bae, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/004,199

(22) Filed: Jan. 22, 2016

(51) Int. Cl.
| | |
|---|---|
| *H04B 1/10* | (2006.01) |
| *H04B 15/00* | (2006.01) |
| *H04B 15/02* | (2006.01) |
| *H04B 1/00* | (2006.01) |
| *H04B 1/401* | (2015.01) |

(52) U.S. Cl.
CPC .......... *H04B 15/02* (2013.01); *H04B 1/0053* (2013.01); *H04B 1/401* (2013.01)

(58) Field of Classification Search
CPC .......... H04B 1/005; H04B 15/02; H04B 1/10; H04B 1/1018; H04B 15/00

USPC .............................................. 455/63.1, 114.2
See application file for complete search history.

(56) References Cited

U.S. PATENT DOCUMENTS

| | | | | |
|---|---|---|---|---|
| 8,278,998 | B2 * | 10/2012 | Kajita ................. | H01L 23/5286 327/551 |
| 8,811,920 | B2 * | 8/2014 | Deuchars .............. | H03F 1/0227 257/299 |
| 8,823,448 | B1 * | 9/2014 | Shen ....................... | H02M 1/44 327/552 |
| 2006/0232354 | A1 * | 10/2006 | Gilliland ................. | H01F 21/06 333/12 |
| 2011/0128087 | A1 * | 6/2011 | Chikando ............ | H03H 7/0153 333/17.1 |

* cited by examiner

*Primary Examiner* — Blane Jackson
(74) *Attorney, Agent, or Firm* — Lowenstein Sandler LLP

(57) ABSTRACT

A processing device detects an occurrence of the first set of use conditions associated with a power supply line coupled between a power source and a power sink in a user device. The processing device sets a tunable decoupling capacitor on the power supply line to a first capacitance value to reduce a level of electromagnetic interference on the power supply line at a first frequency corresponding to the first capacitance value. When the processing device detects a change from the first set of use conditions associated with the power supply line to a second set of use conditions, the processing device sets the tunable decoupling capacitor to a second capacitance value to reduce a level of electromagnetic interference on the power supply line at a second frequency corresponding to the second capacitance value.

6 Claims, 12 Drawing Sheets

MITIGATING ELECTROMAGNETIC INTERFERENCE AND COMPATIBILITY ISSUES

BACKGROUND

Users enjoy entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Embodiments are described for mitigating electromagnetic interference in the power supply line of a user device using a tunable decoupling capacitor. Today's highly integrated and sophisticated electronic systems suffer from electromagnetic emissions, electromagnetic interference (EMI) and electromagnetic compatibility (EMC) issues with other circuit components. These issues can cause the device to fail to meet various regulatory requirements or even desensitize other receivers in the device. Certain devices attempt to address these EMC/EMI issues by using many decoupling capacitors of different values on the power supply lines in the device to filter noise in the range of very low frequencies up to radio and microwave frequencies.

Decoupling capacitors are used to decouple one part of an electrical network (e.g., a circuit) from another part of the network. Noise caused by other circuit elements can be shunted through a decoupling capacitor to reduce or eliminate an effect of the noise on the rest of the circuit. For example, noise from a radio frequency (RF) antenna in a user device may be coupled onto a power supply line between a power source and a power sink in the device. A decoupling capacitor attached to the power supply line can remove at least a portion of the noise and prevent the noise from interfering with the component that is receiving power over the power supply line. Another kind of decoupling involves stopping a portion of a circuit from being affected by switching that occurs in another portion of the circuit. The switching may cause fluctuations in the power supply or other electrical lines, which may be undesirable if applied to other circuit elements which have nothing to do with that switching. A decoupling capacitor can decouple the circuits to prevent any unwanted effects of the switching.

Since noise can appear in the system from a variety of different sources and at a variety of different frequencies, capacitors having different capacitance values can be used to more effectively reduce the EMI at the different frequencies. Using multiple different capacitors can increase the bill of materials (BOM) count (i.e., the number of components used) in the device, increase the cost of the device and take up additional space within the device. In one embodiment, however, a tunable decoupling capacitor can be used in place of the multiple capacitors having different capacitance values. The tunable decoupling capacitor can be used to reduce the noise generated from aggressors by dynamically and adaptively changing the capacitance value to decouple the noise in response to load conditions and other system feedback. The use of the tunable decoupling capacitor can limit the number of capacitors of different values that are used, reduce the overall BOM count, and help to reduce cost and optimize space in the user device.

Figure 1:
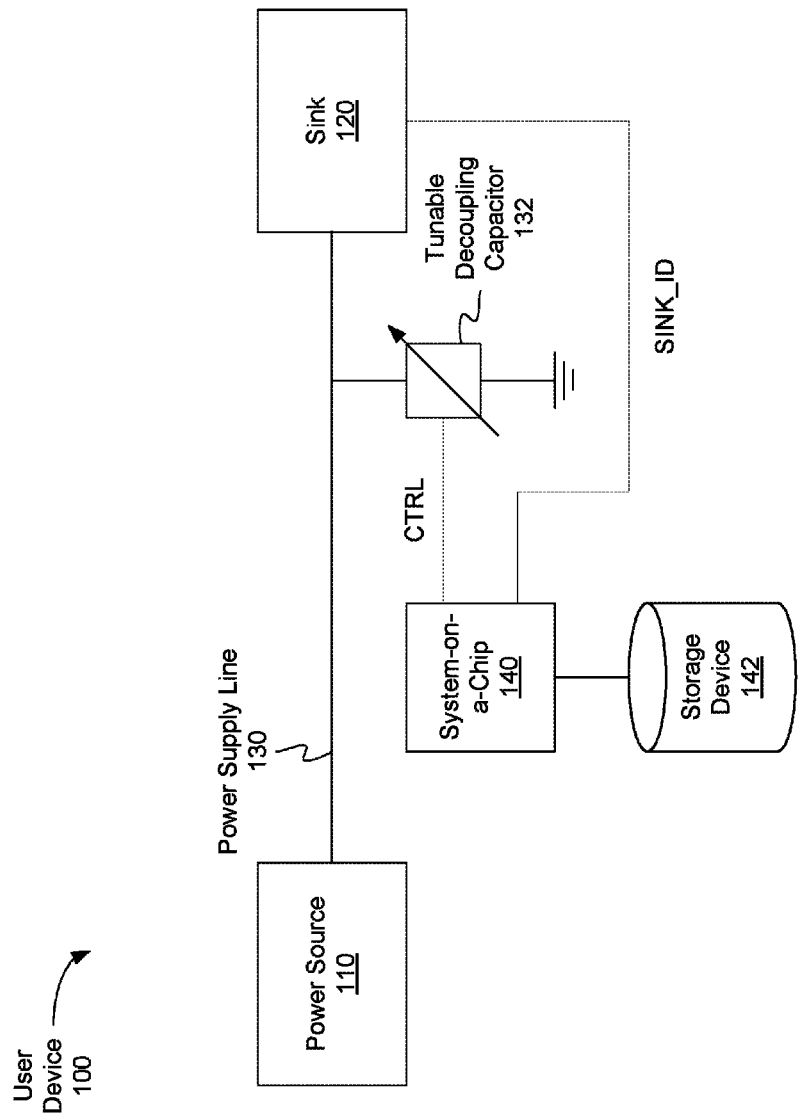
FIG. 1 is a block diagram illustrating a tunable decoupling capacitor in a user device, according to an embodiment.

FIG. 1 is a block diagram illustrating a tunable decoupling capacitor in a user device, according to an embodiment. In one embodiment, a user device 100 includes a power source 110 and a power sink 120. Power source 110 may provide a direct current (DC) power supply voltage to power sink 120 over a power supply line 130 coupled between power source 110 and power sink 120. User device 100 may be any type of computing device including an electronic book reader, a PDA, a mobile phone, a laptop computer, a portable media player, a tablet computer, an electronic pad, a desktop computer, a camera, a video camera, a netbook, or similar computing device. In one embodiment, power source 110 may include a battery, power adaptor, or power management integrated circuit (PMIC) that is used to supply a source voltage to various load circuits (e.g., power sink 120) that is used for some intended operation. Power sink 120 may be any component or circuit within user device 100, such as a switching regulator, RF power amplifier, system-on-a-chip (SoC), audio subsystem, display, touch sensor, camera, RF transceiver, RF switch, RF tuner or any active element in the device.

In one embodiment, power supply line 130 and other power supply lines in the device 100 from power source 110 to each of these different active components may have different levels of stress in terms of noise voltages riding over the supply voltage due to differences in load and load activity, differences in power traces carrying that DC power and different power supply rejection ratios. In addition, the noise on any one power supply line 130 may change over time due to the same or similar influences. In one embodiment, tunable decoupling capacitor 132 is coupled to power supply line 130. A processing device, such as SoC 140, can tune decoupling capacitor 132 in response to varying load conditions. For example, via control signal CTRL, SoC 140 can vary the capacitance of tunable decoupling capacitor 132 based on noise levels associated with the power sink 120.

Depending on the technology used to implement tunable decoupling capacitor 132, SoC 140 may adjust the capacitance value in a number of different ways. The thickness of the depletion layer of a reverse-biased semiconductor diode varies with the DC voltage applied across the diode. Devices specifically sold as variable capacitance diodes are designed with a large junction area and a doping profile specifically designed to maximize capacitance. Thus, the control signal CTRL may be a variable voltage signal. Tunable decoupling capacitor may also be digitally tuned when Barium Strontium Titanate (BST) and silicon-on-insulator (SOI)/silicon-on-sapphire (SOS) technologies are used. BST devices vary the capacitance by applying high voltages to the device. SOI/SOS tuning devices are constructed as solid state field effect transistor (FET) switches built on insulated wafers and use metal-insulator-metal (MIM) capacitors arranged in binary-weighted values to achieve different capacitance values. In one embodiment, control signal CTRL may also mechanically control tunable decoupling capacitor 132 to change the distance between plates.

In one embodiment, power sink 120 may have a number of predetermined capacitance values stored in storage device 142 that correspond generally to low frequency noise, mid frequency noise and high frequency noise. Each capacitance value can have a different frequency response and the decoupling capacitor 132 can be tuned very quickly in response to the varying noise levels measured on the power supply line. In one embodiment, power sink 120 may have a precharacterized capacitance value stored in storage device 142. Thus when, SoC 140 receives an indication (e.g., SINK_ID signal) that power sink 120 is currently drawing power from power source 110, SoC 140 can set the capacitance of tunable decoupling capacitor 132 to the precharacterized capacitance value via control signal CTRL.

In one embodiment, SoC 140 can adjust the capacitance of tunable decoupling capacitor 132 depending on whether an RF power amplifier (i.e., one example of power sink 120) is operating in an envelope tracking (ET) or average power tracking (APT) mode. In the ET mode, the power supply line 130 generally cannot have more than a certain amount of decoupling as the envelope tracking bias cannot be slowed down or else the envelope tracking functionality will be diminished. Thus, the signal SINK_ID may include an indication of the mode of operation of power sink 120. When the indication indicates ET mode, SoC 140 can identify a corresponding predetermined capacitance value from storage device 142 and set tunable decoupling capacitor 132 to the corresponding value. Alternatively, when the same power amplifier is being used in average power tracking or envelope power tracking mode, the bias is not tracking the envelope in real time and decoupling capacitance values can be increased to reduce the noise coming from a switcher that is used to support average power tracking mode. Thus, when the signal SINK_ID includes an indication of APT mode, SoC 140 can identify a different predetermined capacitance value from storage device 142 and set tunable decoupling capacitor 132 to the different corresponding value. Thus, the tunability of decoupling capacitor 132 is useful to adjust the capacitance depending on the mode in which the device is currently operating.

In one embodiment, SoC 140 may itself function as the power sink. In this embodiment, SoC 140 may be coupled to power source 110 by power supply line 130. Power source 110 may provide the power supply signal to SoC 140 over power supply line 130. In this embodiment, the SINK_ID signal may not be necessary, as SoC 140 can identify itself, determine the corresponding capacitance value from storage device 142, and power source set the capacitance of tunable decoupling capacitor 132 to the precharacterized capacitance value via control signal CTRL. SoC 140 may itself already have knowledge of whether the device 100 is operating in ET or APT mode and can set the capacitance value accordingly.

Figure 2:
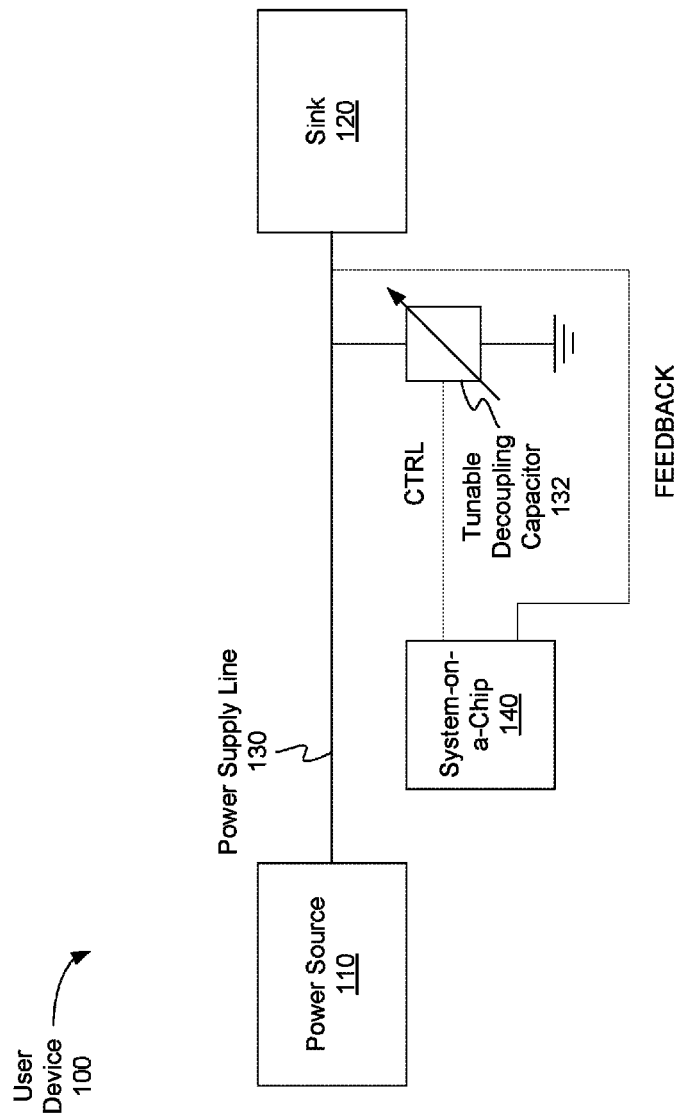
FIG. 2 is a block diagram illustrating a tunable decoupling capacitor in a user device, according to another embodiment.

FIG. 2 is a block diagram illustrating a tunable decoupling capacitor in a user device, according to another embodiment. In this embodiment, SoC 140 receives a FEEDBACK signal that includes an indication of the actual level of noise on power supply line 130. The FEEDBACK signal can provide a measurement of the issues that arise with respect to spurious, receiver band noise, harmonics or switcher noise. Tuning of decoupling capacitor 132 can be achieved based on the FEEDBACK signal with mobile industry processor interface (MIPI) control via control signal CTRL for fast switching controlled from SoC 140 after a spectral analysis of the desired spectrum is done for given noise characteristics. For example, decision making can be done based on readings of modem parameters such as in band receiver sensitivity, wide band spectral plot, bit error rate (BER), packet error rate (PER), received signal strength indicator (RSSI), etc. SoC 140 can also monitor the switching frequency of the regulator, the power supply voltage, power delivery, any overshoots, rise time, fall time, settling time, peak currents, voltage drops, clock signals, or any other characteristics of the signals on power supply line 130.

In one embodiment, the FEEDBACK signal includes an indication of the current noise level on power supply 130 using any of the metrics described above. SoC 140 can perform a real-time tuning process by changing the capacitance of tunable decoupling capacitor 132 and measuring the effect on the noise level in the FEEDBACK signal. In one embodiment, SoC 140 can continually change the capacitance value of tunable decoupling capacitor 132 in response to the current noise level as compared to the previous noise level associated with the previous capacitance value.

In one embodiment, the FEEDBACK signal includes a measurement of the inrush current in power supply line 130. Inrush current, also known as input surge current or switch-on surge current, is the maximum, instantaneous input current drawn by an electrical device when first powered on. Certain circuits or components may draw several times their normal full-load current when first energized, at least for a few cycles of the input waveform. Power converters also often have inrush currents much higher than their steady state currents, due to the charging current of the input capacitance. In one embodiment, decoupling capacitor 132 can serve as an overcurrent protection device, without interrupting the circuit when the inrush current flows. If the FEEDBACK signal indicates that the inrush current in power supply line 130 is above some threshold, SoC 140 can adjust the capacitance of tunable decoupling capacitor 132 in order to reduce and avoid spikes in the inrush current.

Figure 3:
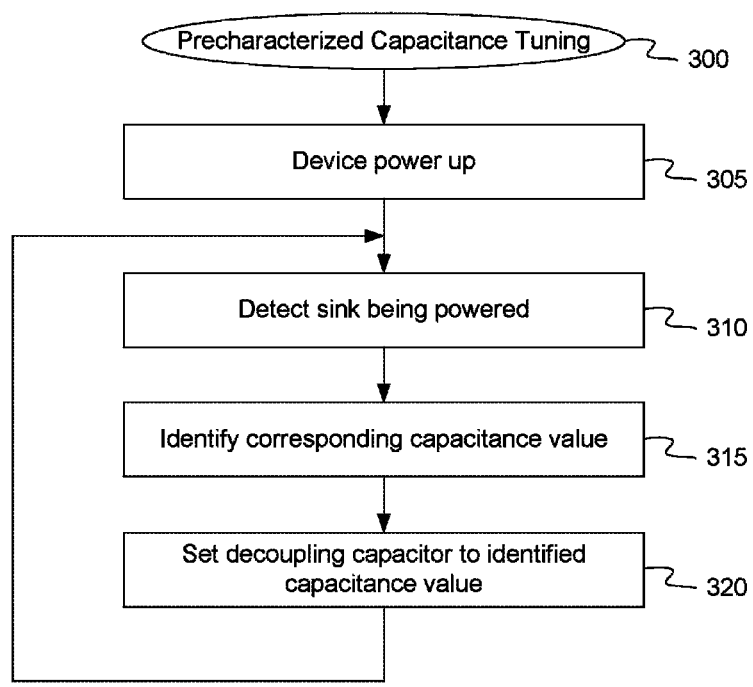
FIG. 3 is a flow diagram illustrating a method for pre-characterized tuning of a decoupling capacitor, according to an embodiment.

FIG. 3 is a flow diagram illustrating a method for pre-characterized tuning of a decoupling capacitor, according to an embodiment. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on load conditions in order to reduce the noise level on a power supply line. In one embodiment, method 300 may be performed by SoC 140, as shown in FIGS. 1 and 2.

Referring to FIG. 3, at block 305, method 300 powers up user device 100. In one embodiment, user device 100 may be activated from a previously deactivated state or may be rebooted from a previously active state. At block 310, method 300 detects power sink 120 being powered by power source 110. In one embodiment, power sink 120 receives a supply voltage from power source 110 over a power supply line 130. SoC 140 may receive SINK_ID signal which includes an identifier of power sink 120 and an indication that power sink 120 is currently drawing power from power source 110 over power supply line 130. The SINK_ID signal may further include an indication of the actual or expected frequency of the noise on power supply line 130 associated with power sink 120.

At block 315, method 300 identifies a capacitance value corresponding to power sink 120. In one embodiment, power sink 120 may have a number of predetermined capacitance values stored in storage device 142 that correspond generally to low frequency noise, mid frequency noise and high frequency noise associated with power sink 120. Each capacitance value can have a different frequency response and the decoupling capacitor 132 can be tuned very quickly in response to the varying noise levels measured on the power supply line. Thus when, SoC 140 receives an indication that power sink 120 is currently drawing power from power source 110, SoC 140 can identify the corresponding precharacterized capacitance value from storage device 142.

At block 320, method 300 sets decoupling capacitor 132 to the corresponding capacitance value identified at block 315. In one embodiment, SoC 140 provides a control signal CTRL which includes a voltage corresponding to the desired capacitance value. By varying the voltage applied to decoupling capacitor 132 via control signal CTRL, SoC 140 can adjust the capacitance of decoupling capacitor 132 to match the capacitance value identified at block 315. In one embodiment, method 300 returns to block 310 and repeats the operations at blocks 310-320 as needed. If a new power sink 120 is detected, method 300 can identify a new corresponding capacitance value and tune decoupling capacitor 132 accordingly.

Figure 4:
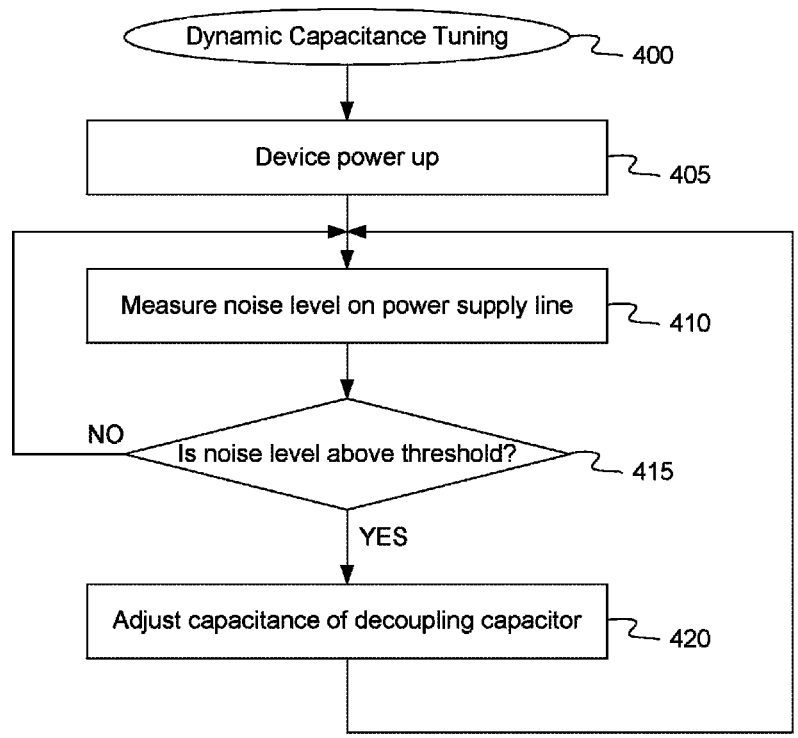
FIG. 4 is a flow diagram illustrating a method for dynamic tuning of a decoupling capacitor, according to embodiment.

FIG. 4 is a flow diagram illustrating a method for dynamic tuning of a decoupling capacitor, according to embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on load conditions in order to reduce the noise level on a power supply line. In one embodiment, method 400 may be performed by SoC 140, as shown in FIGS. 1 and 2.

Referring to FIG. 4, at block 405, method 400 powers up user device 100. In one embodiment, user device 100 may be activated from a previously deactivated state or may be rebooted from a previously active state. At block 410, method 400 measures a noise level on power supply line 130. In one embodiment, power source 110 may supply a DC supply voltage to power sink 120 over power supply line 130. Additional noise signals may be coupled onto power supply line 130 from other components in user device 100. In one embodiment, SoC 140 receives a FEEDBACK signal that includes an indication of the actual level of noise on power supply line 130.

At block 415, method 400 compares the measured noise level to a defined threshold to determine whether the noise level is above the threshold. In one embodiment, the threshold may be configurable by a user, administrator or manufacturer of user device 100 and may be stored in storage device 142. If the noise level is not above the threshold, method 400 may return to block 410 and receive another measurement of the noise level on power supply line 130. In this case, SoC 140 may not activate or adjust the capacitance value of tunable decoupling capacitor 132. If, however, the noise level measured at block 410 is above the threshold, method 400 may proceed to block 420. In another embodiment, the decision at block 415 may be made based on whether the measured noise level is below the threshold. In this embodiment, method 400 may return to block 410 if the noise level is below the threshold and may proceed to block 420 if the noise level is not below the threshold.

At block 420, method 400 can adjust the capacitance value of decoupling capacitor 132, such as by varying the voltage of control signal CTRL, in an attempt to reduce the noise level on power supply line 130. SoC 140 can perform a real-time tuning process by changing the capacitance of tunable decoupling capacitor 132 and measuring the effect on the noise level in the FEEDBACK signal. In one embodiment, SoC 140 can continually change the capacitance value of tunable decoupling capacitor 132 in response to the current noise level as compared to the previous noise level associated with the previous capacitance value.

Figure 5:
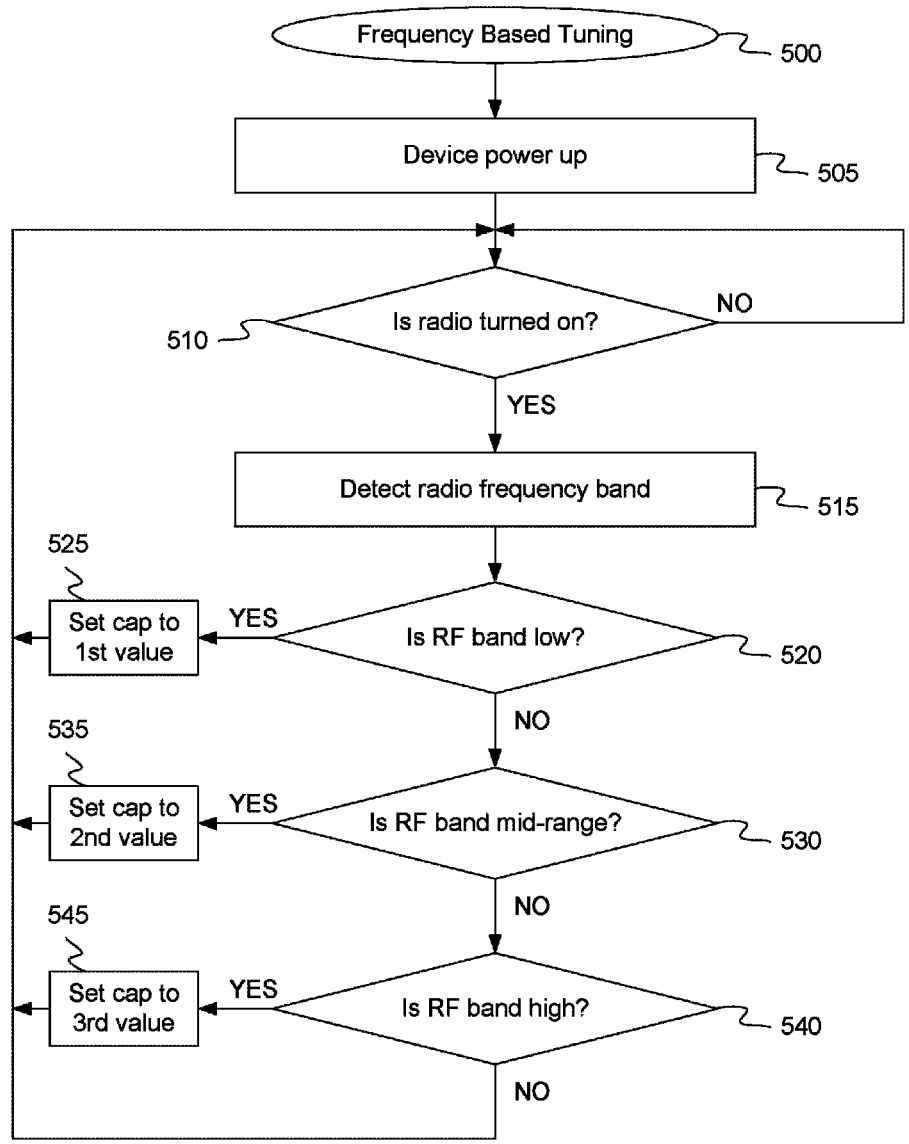
FIG. 5 is a flow diagram illustrating a method for frequency based tuning of a decoupling capacitor, according to embodiment.

FIG. 5 is a flow diagram illustrating a method for frequency based tuning of a decoupling capacitor, according to embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on a radio frequency band being used in order to reduce the noise level on a power supply line. In one embodiment, method 500 may be performed by SoC 140, as shown in FIGS. 1 and 2.

Referring to FIG. 5, at block 505, method 500 powers up user device 100. In one embodiment, user device 100 may be activated from a previously deactivated state or may be rebooted from a previously active state. At block 510, method 500 determines whether a radio transceiver in user device 100 is activated to either transmit or receive radio signals (e.g. WiFi™ wireless signals, Bluetooth™ wireless signals, etc.). In one embodiment, SoC 140 is coupled to the radio transceiver and receives an indication of the status of the transceiver.

If at block 510, method 500 determines that the radio transceiver is activated (e.g., in an ON state), at block 515, method 500 detects the current radio frequency band at which a radio frequency power amplifier (e.g., power sink 120) is operation. In one embodiment, SoC 140 receives an indication of the current radio frequency band as part of the SINK_ID signal from the radio frequency power amplifier. In another embodiment, SoC 140 is able to detect the current radio frequency by measuring current signals.

At block 520, method 500 determines whether the radio frequency power amplifier is operating in a low frequency band. In one embodiment, the low frequency band may be defined to include frequencies below 1 gigahertz or between approximately 698 and 960 megahertz. If, at block 520, method 500 determines that the radio frequency power amplifier is operating in the low frequency band, at block 525, method 500 sets tunable decoupling capacitor 132 to a first capacitance value corresponding to the low frequency band. In one embodiment, the first capacitance value is stored in storage device 142 and includes a value between approximately 100 to 82 picofarads. If the radio frequency power amplifier is not operating in the low frequency band, method 500 proceeds to block 530.

At block 530, method 500 determines whether the radio frequency power amplifier is operating in a middle radio frequency band. In one embodiment, the middle radio frequency band may be defined to include frequencies below between 1 gigahertz and 2 gigahertz or between approximately 1.4 and 2.2 gigahertz. If, at block 530, method 500 determines that the radio frequency power amplifier is operating in the middle radio frequency band, at block 535, method 500 sets tunable decoupling capacitor 132 to a second capacitance value corresponding to the middle radio frequency band. In one embodiment, the second capacitance value is stored in storage device 142 and includes a value between approximately 47 and 27 picofarads. If the radio frequency power amplifier is not operating in the middle radio frequency band, method 500 proceeds to block 540.

At block 540, method 500 determines whether the radio frequency power amplifier is operating in a high radio frequency band. In one embodiment, the high radio frequency band may be defined to include frequencies above 2 gigahertz or between approximately 2.2 and 2.7 gigahertz. If, at block 540, method 500 determines that the radio frequency power amplifier is operating in the high radio frequency band, at block 545, method 500 sets tunable decoupling capacitor 132 to a third capacitance value corresponding to the high radio frequency band. In one embodiment, the third capacitance value is stored in storage device 142 and includes a value between approximately 22 and 12 picofarads.

After setting the capacitance value of decoupling capacitor 132 at any of blocks 525, 535 or 545, method 500 returns to block 510 and repeats the operations at blocks 510-545. For example, method 500 may determine that the radio frequency power amplifier has changed from the low radio frequency band to the middle radio frequency band or from the middle radio frequency band to the high radio frequency band and may set tunable decoupling capacitor 132 to a corresponding capacitance value to reduce a level of electromagnetic interference on power supply line 130 in the corresponding radio frequency band.

Figure 6:
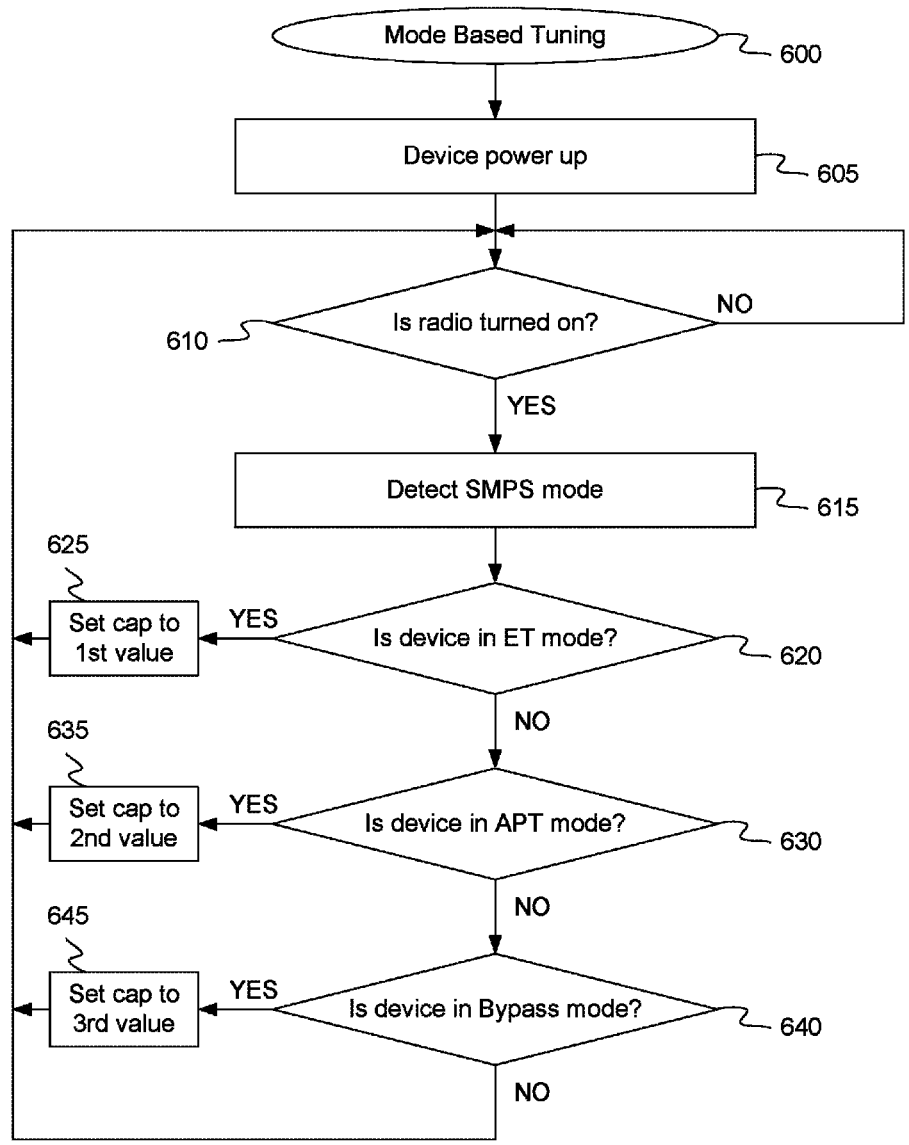
FIG. 6 is a flow diagram illustrating a method for device mode based tuning of a decoupling capacitor, according to an embodiment.

FIG. 6 is a flow diagram illustrating a method for device mode based tuning of a decoupling capacitor, according to an embodiment. The method 600 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on a mode of operation in order to reduce the noise level on a power supply line. In one embodiment, method 600 may be performed by SoC 140, as shown in FIGS. 1 and 2.

Referring to FIG. 6, at block 605, method 600 powers up user device 100. In one embodiment, user device 100 may be activated from a previously deactivated state or may be rebooted from a previously active state. At block 610, method 600 determines whether a radio transceiver in user device 100 is activated to either transmit or receive radio signals (e.g. WiFi™ wireless signals, Bluetooth™ wireless signals, etc.). In one embodiment, SoC 140 is coupled to the radio transceiver and receives an indication of the status of the transceiver.

If at block 610, method 600 determines that the radio transceiver is activated (e.g., in an ON state), at block 615, method 600 detects a current mode of operation of the power source 110 (e.g., a switched mode power supply). In one embodiment, SoC 140 receives an indication of the current mode of operation directly from power source 110. In another embodiment, SoC 140 is able to detect the current mode of operation by measuring current signals on power supply line 130.

At block 620, method 600 determines whether the power source 110 is operating in an envelope tracking mode. If, at block 620, method 600 determines that power source 110 is operating in the envelope tracking mode, at block 625, method 600 sets tunable decoupling capacitor 132 to a first capacitance value corresponding to the envelope tracking mode. In one embodiment, the first capacitance value is stored in storage device 142 and includes a value between approximately 0.1 to 12 picofarads. If the radio frequency power amplifier is not operating in the envelope tracking mode, method 600 proceeds to block 630.

At block 630, method 600 determines whether the power source 110 is operating in an average power tracking mode. If, at block 630, method 600 determines that the power source 110 is operating in the average power tracking mode, at block 635, method 600 sets tunable decoupling capacitor 132 to a second capacitance value corresponding to the average power tracking mode. In one embodiment, the second capacitance value is stored in storage device 142 and includes a value between approximately 12 and 47 picofarads. If the radio frequency power amplifier is not operating in the average power tracking mode, method 600 proceeds to block 640.

At block 640, method 600 determines whether the power source 110 is operating in a bypass mode. If, at block 640, method 600 determines that power source 110 is operating in the bypass mode, at block 645, method 600 sets tunable decoupling capacitor 132 to a third capacitance value corresponding to the high radio frequency band. In one embodiment, the third capacitance value is stored in storage device 142 and includes a value below approximately 1 nanofarad.

After setting the capacitance value of decoupling capacitor 132 at any of blocks 625, 635 or 645, method 600 returns to block 610 and repeats the operations at blocks 610-645. For example, method 600 may determine that the power source 110 has switched modes of operation and may set tunable decoupling capacitor 132 to a corresponding capacitance value to reduce a level of electromagnetic interference on power supply line 130 for the corresponding mode.

Figure 7:
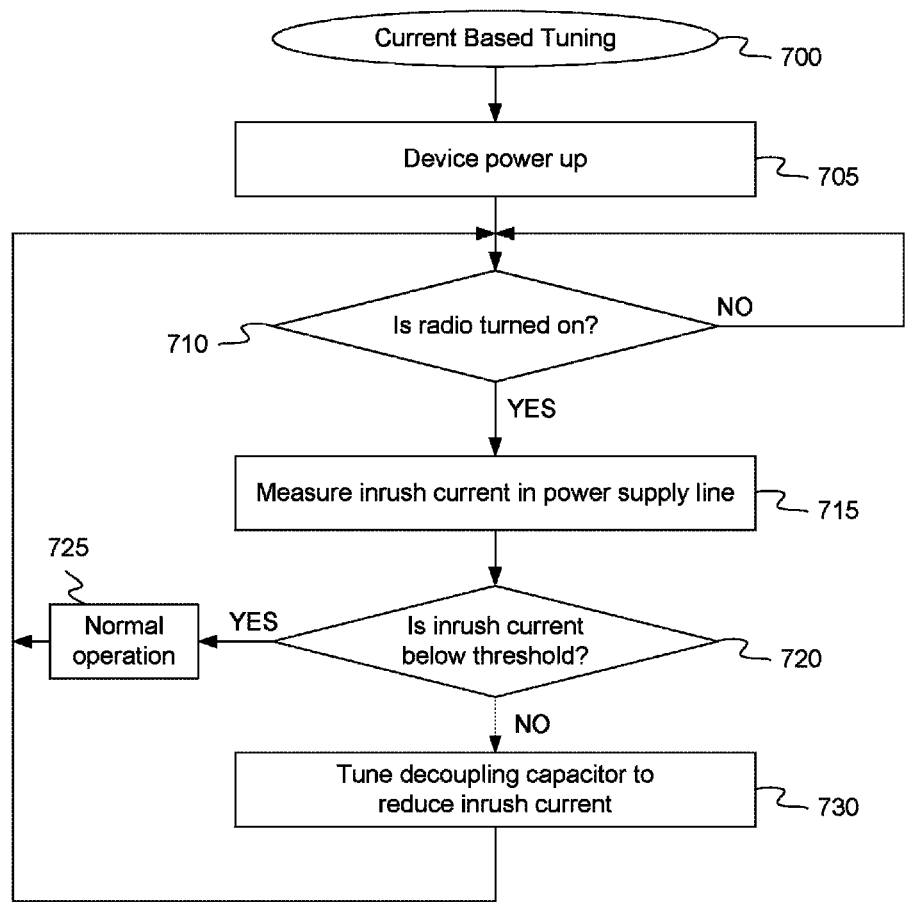
FIG. 7 is a flow diagram illustrating a method for inrush current based tuning of a decoupling capacitor, according to an embodiment.

FIG. 7 is a flow diagram illustrating a method for inrush current based tuning of a decoupling capacitor, according to an embodiment. The method 700 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on an inrush current on a power supply line. In one embodiment, method 700 may be performed by SoC 140, as shown in FIGS. 1 and 2.

Referring to FIG. 7, at block 705, method 700 powers up user device 100. In one embodiment, user device 100 may be activated from a previously deactivated state or may be rebooted from a previously active state. At block 710, method 700 determines whether a radio transceiver in user device 100 is activated to either transmit or receive radio signals (e.g. WiFi™ wireless signals, Bluetooth™ wireless signals, etc.). In one embodiment, SoC 140 is coupled to the radio transceiver and receives an indication of the status of the transceiver.

At block 715, method 700 measures an inrush current on power supply line 130. In one embodiment, power source 110 may supply a DC supply voltage to power sink 120 over power supply line 130. In one embodiment, a FEEDBACK signal received at SoC 140 includes a measurement of the inrush current in power supply line 130. The inrush current is the instantaneous input current drawn by power sink 120 when first powered on. In one embodiment, power sink 120 may draw several times its normal full-load current when first energized, at least for a few cycles of the input waveform.

At block 720, method 700 compares the inrush current level to a defined threshold to determine whether the inrush current is below the threshold. In one embodiment, the threshold may be configurable by a user, administrator or manufacturer of user device 100 and may be stored in storage device 142. If the current level is below the threshold, at block 725, method 700 may continue normal operation and return to block 710. In this case, SoC 140 may not activate or adjust the capacitance value of tunable decoupling capacitor 132. If, however, the inrush current measured at block 715 is not below the threshold, method 700 may proceed to block 730. In another embodiment, the decision at block 720 may be made based on whether the inrush current level is above the threshold. In this embodiment, method 400 may return to block 710 if the noise level is not above the threshold and may proceed to block 730 if the noise level is above the threshold.

At block 730, method 700 can adjust the capacitance value of decoupling capacitor 132, such as by varying the voltage of control signal CTRL, in an attempt to reduce the inrush current on power supply line 130. SoC 140 can perform a real-time tuning process by changing the capacitance of tunable decoupling capacitor 132 and measuring the effect on the inrush current identified in the FEEDBACK signal. In one embodiment, SoC 140 can continually change the capacitance value of tunable decoupling capacitor 132 in response to the current level as compared to the previous current level associated with the previous capacitance value.

Figure 8:
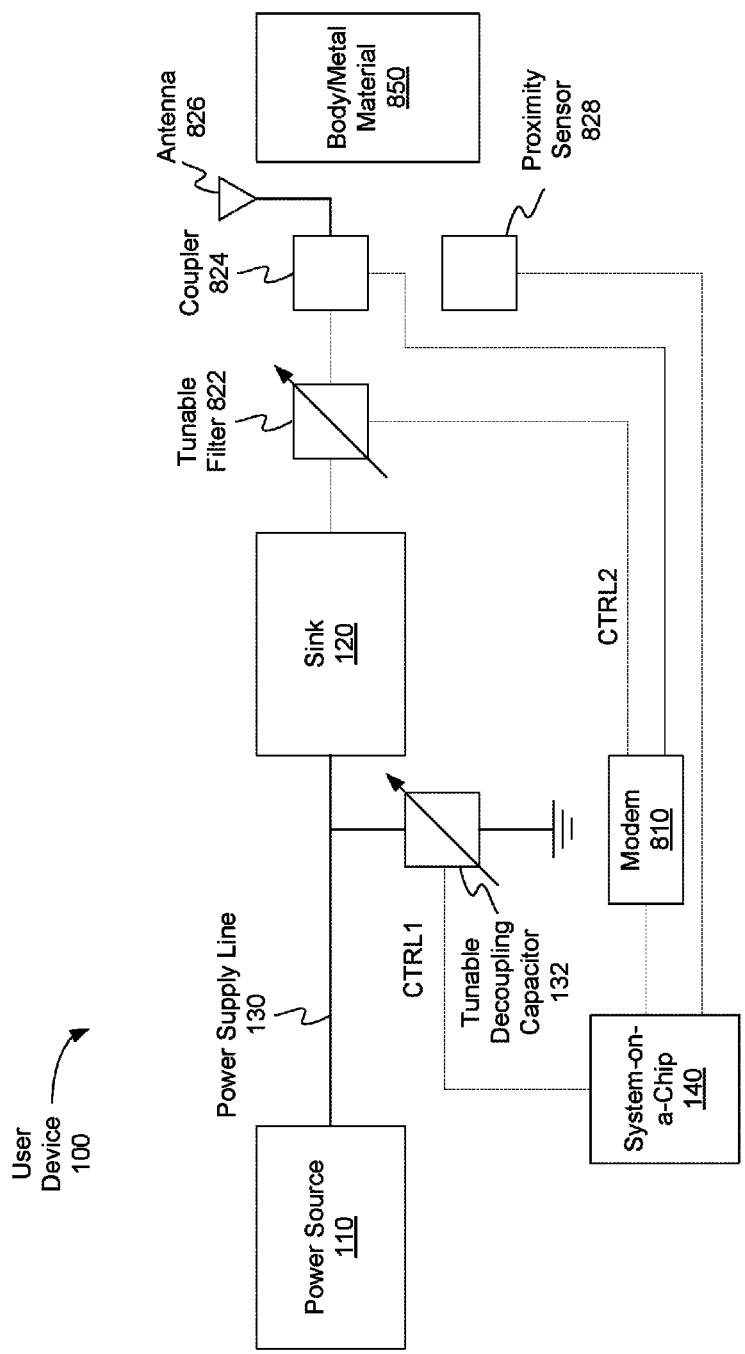
FIG. 8 is a block diagram illustrating a tunable decoupling capacitor using impedance information in a user device, according to an embodiment.

FIG. 8 is a block diagram illustrating a tunable decoupling capacitor using impedance information in a user device, according to an embodiment. In one embodiment, user device 100 includes power source 110 and power sink 120. Power source 110 may provide a DC power supply voltage to power sink 120 over a power supply line 130 coupled between power source 110 and power sink 120, as described above. In one embodiment, power sink 120 includes a radio front end and power amplifier. In addition, user device 100 includes tunable filter 822, coupler 824 and antenna 826. In one embodiment, tunable decoupling capacitor 132 is coupled to power supply line 130 and SoC 140 is connected to tunable decoupling capacitor 132, proximity sensor 828 and modem 810 (e.g., a wireless modem utilizing WiFi™ or Bluetooth™ signals). Modem 810 may be connected to tunable notch filter 822 and coupler 824. SoC 140 can perform adaptive tuning of decoupling capacitor 132 and tunable filter 822 (through modem 810) in response to varying load conditions. For example, via control signals CTRL1 and CTRL 2, SoC 140 can vary the capacitance of tunable decoupling capacitor 132 and the filtering range of tunable filter 822.

In one embodiment, the RF power amplifiers and the complete RF analog front end are impedance matched to a particular value (e.g., 50 ohms). In addition, the harmonic and spurious performance of the radio may be optimized with respect to 50 ohms. When antenna 826 is connected, however, not only the output power varies but also harmonics and spurious emissions. In addition, the antenna load is further variable based on the presence of a body, hand, metal object 850 or any other material. Load variation can also occur during insertions and removals of cables, such as HDMI, USB, audio jack etc., to connectors that are in the vicinity of antenna 826 and can change the electromagnetic field distribution due to current density effects.

In one embodiment, a pre-characterization may be performed (e.g., by a system designer) to determine the impedance load for power, adjacent channel leakage ratio (ACLR), error vector magnitude (EVM), harmonics, spurious emissions and other RF parameters. This pre-characterized information may be stored in the form of a look-up table (e.g., in storage device 142) connected to SoC 140 or to the digital Baseband. The look-up table can also store the tunable capacitance values that can mitigate the power amplifier bias spurious emissions, as well as setting for tunable filter 822 to address harmonics issues. Thus, when load variations occur due to varying antenna load impedances, the SoC 140 can stabilize variations in the spurious and harmonics by adaptively tune decoupling capacitor 132 and tunable filter 822 based on pre-characterization of load impedances.

In one embodiment SoC 140 receives a feedback signal from coupler 824 through modem 810 which can be used to calculate the actual impedance at antenna 826. The feedback signal may include a measurement of reflected power at antenna 826. SoC 140 already knows the transmitted power at antenna 826 and can calculate the actual impedance as a ratio of the reflected power over the transmitted power. In this embodiment, SoC 140 can identify a capacitance value for decoupling capacitor 132 and a set of filter coefficients for filter 822 that correspond to the actual impedance and can set decoupling capacitor 132 and filter 822 (e.g., a notch filter or low pass filter) to the corresponding values in order to reduce the level of electromagnetic interference.

In another embodiment, SoC 140 uses proximity sensor 828 to identify the presence of an object 850 near antenna 826. Object 826 may be a user's hand or body, a metal object, such as a table or automobile, or some other object that can affect the impedance load at antenna 826. Upon detecting the presence of object 850, SoC 140 may receive an indication of the object 850 from proximity sensor 828 and may identify a capacitance value for decoupling capacitor 132 and a set of filter coefficients for filter 822 that correspond to the presence of the object 850. SoC 140 can set decoupling capacitor 132 and filter 822 (e.g., a notch filter or low pass filter) to the corresponding values via control signals CTRL1 and CTRL2. In one embodiment, in addition or in place of proximity sensor 828, user device 100 may include some other environmental sensor. For example, user device 100 may include a Hall effect sensor to determine whether a device cover is closed (which may affect the impedance, an ambient light sensor to determine if an object is covering the device (which can detune the antenna). Feedback from these or any other environmental sensor can be provided to SoC 140, which can set decoupling capacitor 132 and filter 822 accordingly.

In one embodiment, SoC 140 uses a hybrid approach that uses proximity sensor 828 as an initial coarse step and then coupler 824 as a fine-grained step. For example, if sensor 828 detects the presence of object 850, SoC 140 can use a first set of capacitance values and filter coefficients to try to reduce the level of desensitization at antenna 824. If the first set of values and coefficients is not able to bring the desensitization down to an acceptable level, SoC 140 can measure the actual impedance from coupler 824. SoC 140 can perform a real-time tuning process by tuning decoupling capacitor 132 and filter 822 and measuring the effect on the impedance at coupler 824. In one embodiment, SoC 140 can continually change the capacitance value of tunable decoupling capacitor 132 and the coefficients of filter 822 in response to the current impedance as compared to the previous impedance associated with the previous values.

Figure 9:
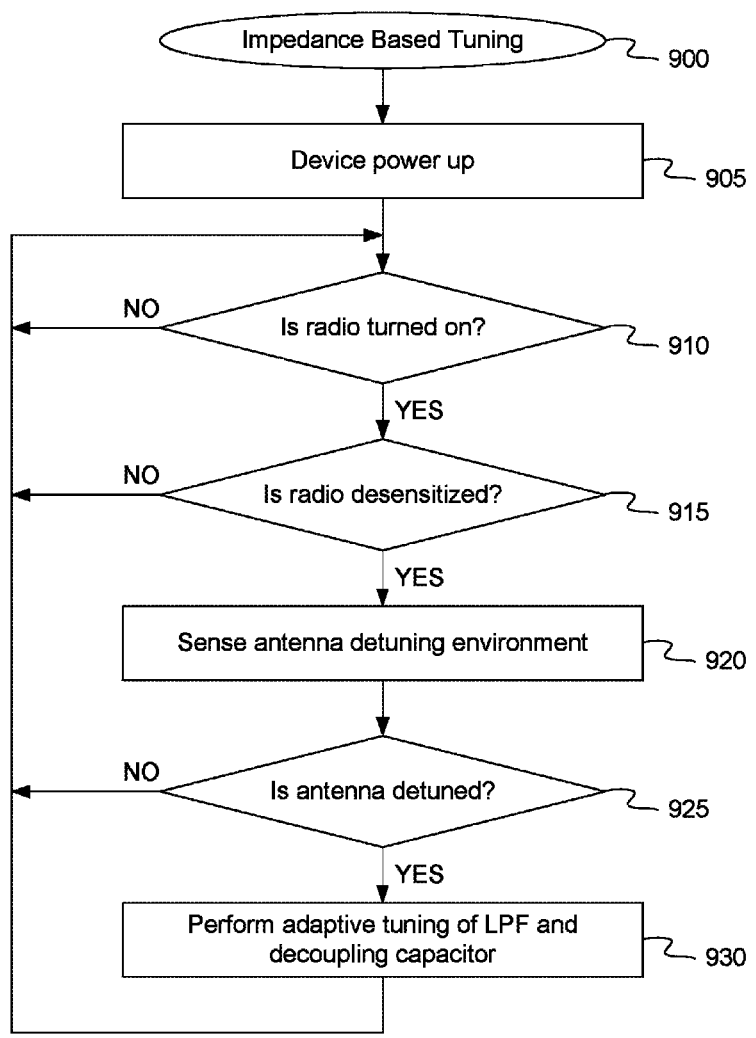
FIG. 9 is a flow diagram illustrating a method for dynamic tuning of a decoupling capacitor using impedance information, according to embodiment.

FIG. 9 is a flow diagram illustrating a method for dynamic tuning of a decoupling capacitor using impedance information, according to embodiment. The method 900 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to set the capacitance value of tunable decoupling capacitor 132 based on an antenna impedance load. In one embodiment, method 900 may be performed by SoC 140, as shown in FIGS. 1 and 2.

Referring to FIG. 9, at block 905, method 900 powers up user device 100. In one embodiment, user device 100 may be activated from a previously deactivated state or may be rebooted from a previously active state. At block 910, method 900 determines whether a radio transceiver in user device 100 is activated to either transmit or receive radio signals (e.g. WiFi™ wireless signals, Bluetooth™ wireless signals, etc.). In one embodiment, SoC 140 is coupled to the radio transceiver and receives an indication of the status of the transceiver.

At block 915, method 900 determines whether the radio has been desensitized. In one embodiment, SoC 140 determines whether there are any electromagnetic interference issues in device 100 by comparing receiver sensitivity, signal-to-noise ratio (SNR), received signal strength indicator (RSSI), channel power, noise power, number of retransmissions, or other radio parameter to a predefined threshold value. If the selected parameter or parameters meet or exceed the corresponding threshold (e.g., are either above or below the threshold depending on how the threshold is defined), SoC 140 may determine that the radio has been desensitized.

If at block 915, method 900 determines that the radio has been desensitized, at block 920, method 900 senses the antenna detuning environment. SoC 140 may use one of the three techniques described above. In one embodiment SoC 140 calculates the actual impedance at antenna 826 using the power measurement received from coupler 824. In another embodiment, SoC 140 uses proximity sensor 828 to identify the presence of an object 850 near antenna 826. In another embodiment, SoC 140 uses a hybrid approach that uses proximity sensor 828 as an initial coarse step and then coupler 824 as a fine-grained step.

At block 925, method 900 determines whether antenna 826 is detuned based on the sensed detuning environment. In one embodiment, this determination is made using a pre-characterization of the radio frequency front-end (RFFE) and the antenna subsystem. Generally in a loadpull analysis, the system may pre-characterize impedances and corresponding RF parameters, such as output power, adjacent channel leakage ratio (ACLR), harmonics, spurious emissions, error vector magnitude (EVM), current, desensitization of transmission, etc., and then tune the impedance either one time or in real time for output power, current or ACLR. In one embodiment, however, the system can detune the impedance such that harmonics and spurious performance can be optimized rather than power, ACLR and current if there is enough margin. This allows for a greater margin on EMI/EMC related items. Pre-characterizing and define impedances with these parameters to later make a judgement on which way to prioritize makes this determination possible.

If at block 925, method 900 determines that antenna 826 is detuned, at block 930, method 900 performs adaptive tuning of decoupling capacitor 132 and filter 822. In one embodiment, SoC 140 identifies a capacitance value for decoupling capacitor 132 and a set of filter coefficients for filter 822 that correspond to the actual impedance or the presence of object 850 and can set decoupling capacitor 132 and filter 822 (to the corresponding values via control signals CTRL1 and CTRL2. In another embodiment, SoC 140 can continually change the capacitance value of tunable decoupling capacitor 132 and the coefficients of filter 822 in response to the current impedance as compared to the previous impedance associated with the previous values.

Figure 10:
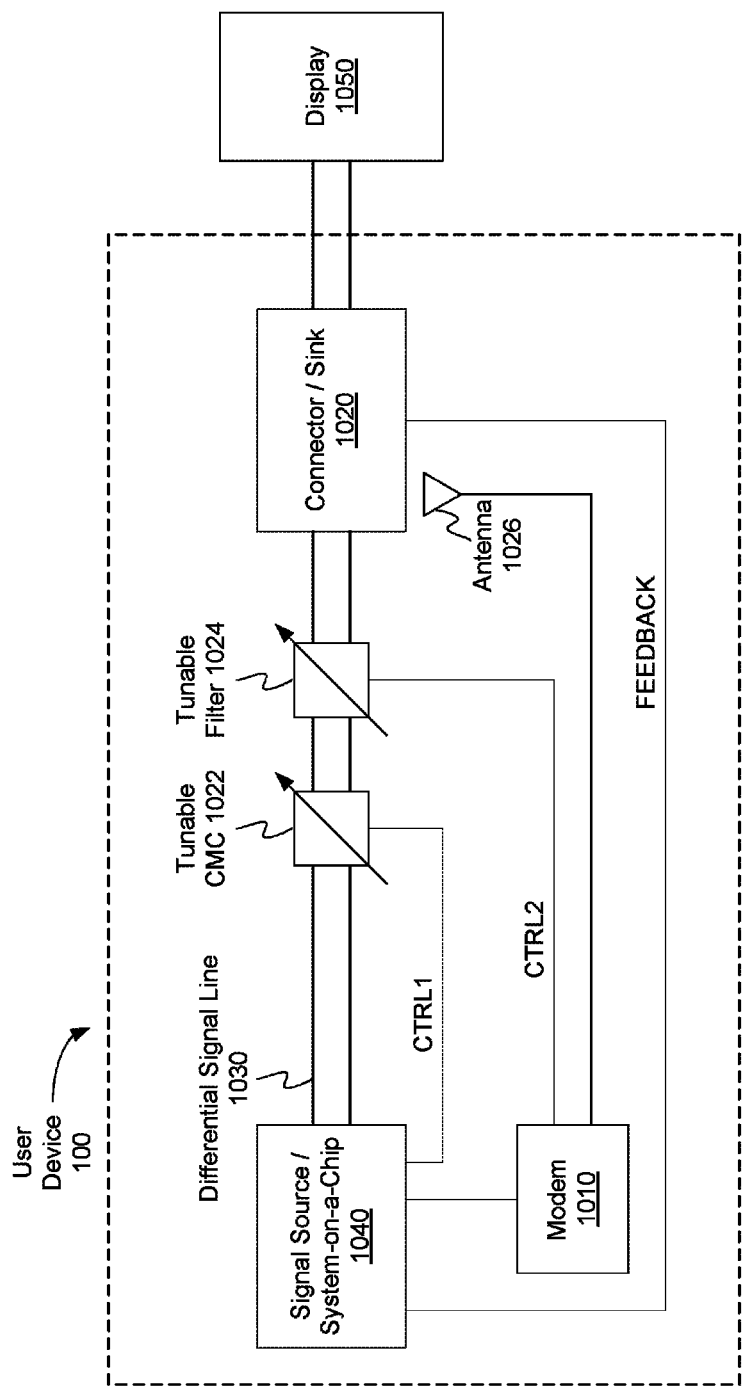
FIG. 10 is a block diagram illustrating a tunable common mode choke in a user device, according to an embodiment.

FIG. 10 is a block diagram illustrating a tunable common mode choke in a user device, according to an embodiment. In one embodiment, user device 100 includes signal source/system-on-a-chip (SoC) 1040 and a connector/sink 1020. Signal source 1040 may provide a data signal to connector/sink 1020 over a differential signal line 1030 coupled between signal source 1040 and connector/sink 1020. In one embodiment, connector/sink 1020 may be an external connector for user device 100, such as a high-definition multimedia interface (HDMI) or universal serial bus (USB) connector, used to connect an external component such as display 1050 (e.g., a television or computer monitor) to user device 100. Differential signal line 1030 may include any type signal line that utilizes a pair of wires or traces to convey a differential pair of signals (e.g., HDMI, USB, clock).

In one embodiment, user device 100 further includes modem 1010 (e.g., a wireless modem utilizing WiFi™ or Bluetooth™ signals) and antenna 1026. A variety of aggressor signals, such as those from modem 1010 and antenna 1026, can generate noise on differential signal line 1030, potentially reducing a signal integrity of the signals transmitted across differential signal line 1030. In one embodiment, a tunable common mode choke (CMC) 1022 and a tunable filter 1024 (e.g., a low pass filter) can be coupled to differential signal line 1030 to reduce the noise levels present on differential signal line from aggressor signals. In one embodiment, signal source/SoC 1040 can dynamically and adaptively tune common mode choke 1022 and tunable filter 1024 through modem 1010 to maintain signal integrity and limit the amount of RF desensitization and spurious emissions that can arise from fast rise times of USB or HDMI signals. SoC can set values of common mode choke 1022 and tunable filter 1024 through modem 1010 in order to balance a trade-off between signal integrity and less noise for meeting USB and HDMI compliance specifications.

Common mode choke 1022 includes an inductor used to block higher-frequency alternating current (AC) on differential signal line 1030, while passing lower-frequency or direct current (DC) signals. Common mode choke 1022 may include two coils of insulated wire wound on a magnetic core. Each coil passes an equal but opposite differential current while blocking common-mode currents. The choke's impedance may increase with frequency may pass both AC and DC with little power loss due to low electrical resistance. SoC 1040 can tune common mode choke 1022 by varying the voltage applied via control signal CTRL1.

In one embodiment, modem 1010 may characterize certain signal parameters such as receiver sensitivity, signal-to-noise ratio (SNR), received signal strength indicator (RSSI), channel power, noise power, throughput, number of retransmissions, or other parameters to indicate the current level of performance of the radio system. Modem 1010 may provide an indication of these parameters to SoC 1040, which can determine if the radio has been desensitized. SoC 1040 can further receive a FEEDBACK signal from connector 1020 that characterizes the signal integrity on differential signal line 1030 using rise/fall times, peak currents, drive strength, slew rate, settling time, overshoots, etc. Based on the signal integrity and RF desensitization, SoC 1040 can tune common mode choke 1022 and tunable filter 1024 through modem 1010 via control signals CTRL1 and CTRL2, respectively.

Dynamic tuning of common mode choke 1022 may include selecting the settings in terms of a best trade-off between signal integrity, RF desensitization and regulatory performance. In one embodiment, SoC 1040 stores precharacterized values for tunable common mode choke 1022 that gives best signal integrity and RF performance under different varying usage conditions of device. These conditions may include connection to different displays 1050, as each display may produce different type and level of noise), whether a USB cable is plugged in under full speed (12 mbps), high speed (480 Mbps) or USB3.0 mode, etc. In another embodiment, SoC 1040 can actively tune the settings for common mode choke 1022 and filter 1024 in response to the current signal integrity and RF desensitization as compared to the previous values.

Figure 11:
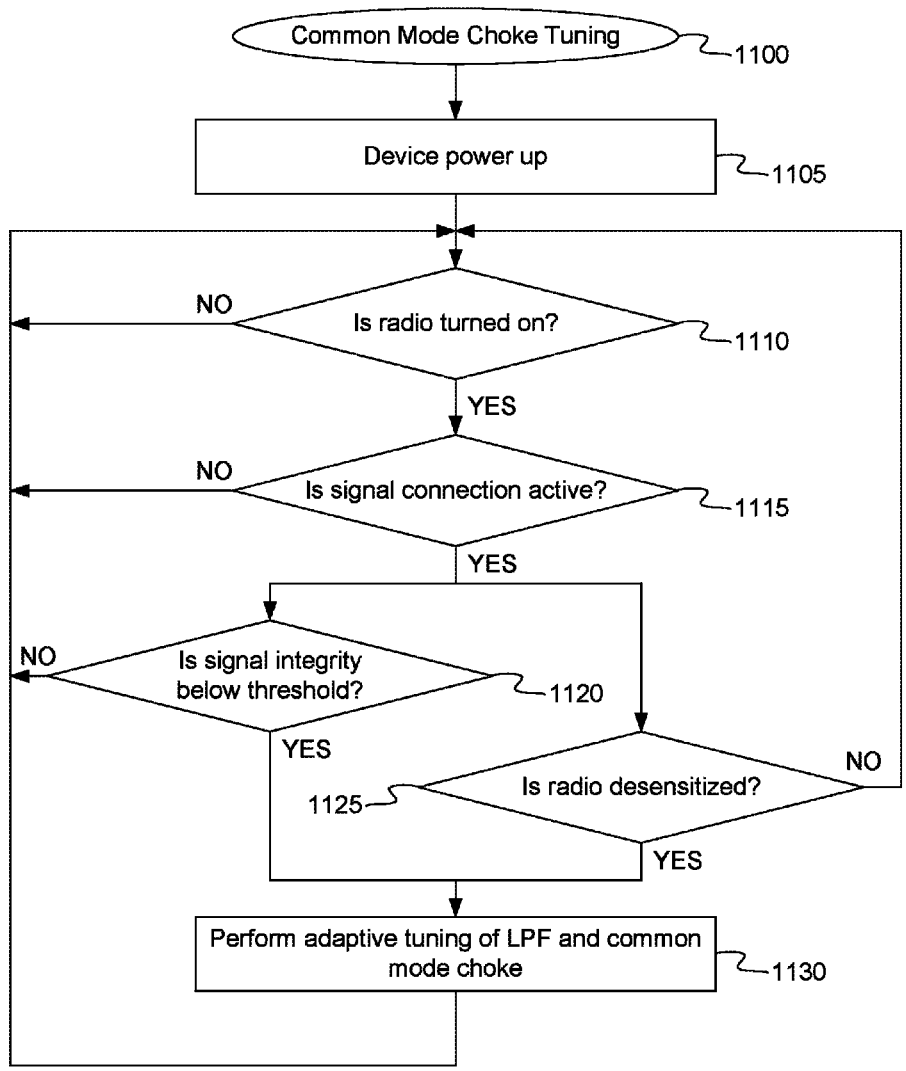
FIG. 11 is a flow diagram illustrating a method for dynamic tuning of a common mode choke in a user device, according to an embodiment.

FIG. 11 is a flow diagram illustrating a method for dynamic tuning of a common mode choke in a user device, according to an embodiment. The method 1100 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to tune a common mode choke on a differential signal line based on varying usage conditions. In one embodiment, method 1100 may be performed by SoC 1040, as shown in FIG. 10.

Referring to FIG. 11, at block 1105, method 1100 powers up user device 100. In one embodiment, user device 100 may be activated from a previously deactivated state or may be rebooted from a previously active state. At block 1110, method 1100 determines whether modem 1010 in user device 100 is activated to either transmit or receive radio signals (e.g. WiFi™ wireless signals, Bluetooth™ wireless signals, etc.). In one embodiment, SoC 1040 is coupled modem 1010 and receives an indication of the status of the modem 1010.

At block 1115, method 1100 determines whether a signal connection at connector/sink 1020 is active. A connection may be active if an external device, such as display 1050 is plugged into connector 1020 (e.g., via an HDMI or USB cable) and whether signal source 1040 is providing a signal to connector 1020 over differential signal line 1030. In one embodiment, a FEEDBACK signal received by modem 1010 from connector 1020 and provided to SoC 1040 includes an indication of whether there is an active signal connection at connector 1020.

If the signal connection is active, at bock 1120, method 1100 determines whether the current signal integrity level on differential signal line 1030 is below a threshold. In one embodiment, modem 1010 can receive a FEEDBACK signal from connector 1020 that characterizes the signal integrity on differential signal line 1030 using rise/fall times, peak currents, drive strength, slew rate, settling time, overshoots, or other parameters. Modem 1010 can provides these parameters to SoC 1040 which can compare the parameter values to corresponding thresholds to determine whether the signal integrity satisfies a compliance specification.

If the signal connection is active, at block 1125, method 1100 also determines whether the device radio is desensitized. In one embodiment, modem 1010 may characterize certain signal parameters such as receiver sensitivity, signal-to-noise ratio (SNR), received signal strength indicator (RSSI), channel power, noise power, throughput, number of retransmissions, or other parameters to indicate the current level of performance of the radio system. SoC 1040 can compare these parameters to corresponding thresholds to determine whether the radio performance is satisfactory.

If method 1100 determines that the signal integrity or radio sensitivity is compromised at either of block 1120 or 1125, at block 1130, method 1100 can perform an adaptive tuning of common mode choke 1022 and tunable filter 1024 via control signals CTRL1 and CTRL2, respectively. SoC 1040 can either identify precharacterized values from a look-up table that correspond to the current load conditions or actively tune the settings for common mode choke 1022 and filter 1024 in response to the current signal integrity and RF desensitization as compared to the previous values. This enables SoC 1040 to strike a balance between signal integrity and RH desensitization due to different noise sources or different load impedances causing variations in the noise and spurious emissions.

Figure 12:
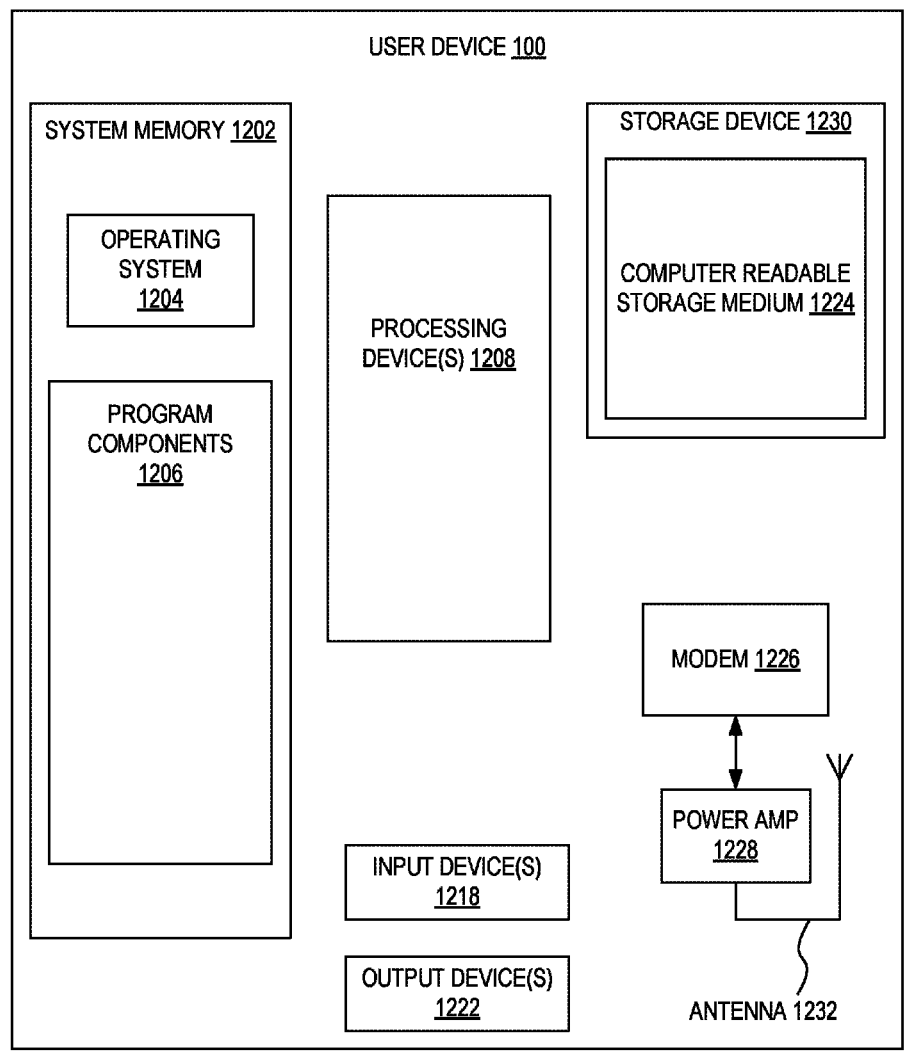
FIG. 12 is a block diagram illustrating a user device configured for tuning a decoupling capacitor, according to an embodiment.

FIG. 12 is a block diagram illustrating a user device configured for filtering of frequency hopping aggressor signals from different antennas, according to an embodiment. Electronic device 100 may include for example, an electronic book reader (eReader), cellular telephone, smartphone, personal digital assistant (PDA), portable media player, tablet computer, electronic pad, netbook, desktop computer, notebook computer, or the like.

The electronic device 100 includes one or more processing devices 1208, such as one or more CPUs, microcontrollers, field programmable gate arrays, or other types of processing devices. The electronic device 100 also includes system memory 1202, which may correspond to any combination of volatile and/or non-volatile storage mechanisms. The system memory 1202 stores information which provides an operating system component 1204 and various program components 1206. The user device 100 performs functions by using the processing device(s) 1208 to execute instructions provided by the system memory 1202. In one embodiment, processing device(s) 1208 and system memory 1202 may form part of system-on-a-chip 140 or 1040.

The user device 100 also includes a data storage device 1230 that may be composed of one or more types of removable storage and/or one or more types of non-removable storage. Storage device 1230 may include a main memory, such as read-only memory (ROM), flash memory, dynamic random access memory (DRAM) (such as synchronous DRAM (SDRAM), etc.), or a static memory, such as flash memory, static random access memory (SRAM), etc. In other embodiments, storage device 1230 may include some other type of storage device for storing information in a form (e.g., software, processing application) readable by a machine (e.g., a computer). The storage device 1230 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions. In one embodiment, the data storage device 1230 includes a computer-readable storage medium 1224 on which is stored one or more sets of instructions embodying any one or more of the methodologies or functions described herein. As shown, the instructions may reside, completely or at least partially, within the non-transitory computer readable storage medium 1224, system memory 1202 and/or within the processing device(s) 1208 during execution thereof by the user device 100, the system memory 1202 and the processing device(s) 1208 also constituting computer-readable media. The user device 100 may also include one or more input devices 1218 (keyboard, mouse device, specialized selection keys, etc.) and one or more output devices 1222 (displays, printers, audio output mechanisms, etc.).

The user device 100 further includes a wireless modem 1226 to allow the user device 100 to communicate via a wireless network (e.g., such as provided by the wireless communication system) and/or with other computing devices, such as remote computers, the item providing system, online book stores, electronic catalogs for libraries, and so forth. The wireless modem 1226 may allow the user device 100 to handle both voice and non-voice communications (such as communications for text messages, multimedia messages, media downloads, web browsing, etc.). The wireless modem 1226 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi™, etc. The wireless modem 1226 may generate signals and send these signals to power amplifier (amp) 1228 for amplification, after which they are wirelessly transmitted via antenna 1232. In addition to sending data, antenna 1232 also receives data, which is sent to wireless modem 1226 and transferred to processing device(s) 1208.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining a first capacitance value corresponding to a first set of load conditions associated with a power supply line in a user device;
   determining a second capacitance value corresponding to a second set of load conditions associated with the power supply line;
   detecting a first level of electromagnetic interference on the power supply line;
   determining that the first level of electromagnetic interference is above a threshold level;
   detecting occurrence of the first set of load conditions associated with the power supply line;
   setting, by a processing device, a tunable decoupling capacitor on the power supply line to the first capacitance value to reduce the first level of electromagnetic interference on the power supply line to a second level of electromagnetic interference lower than the first level;
   detecting a change from the first set of load conditions associated with the power supply line to the second set of load conditions; and
   setting, by the processing device, the tunable decoupling capacitor on the power supply line to the second capacitance value to reduce the first level of electromagnetic interference on the power supply line to a third level of electromagnetic interference lower than the first level.

2. The method of claim 1, wherein detecting occurrence of the first set of load conditions associated with the power supply line comprises determining that a radio frequency circuit in the user device is operating in a first radio frequency band.

3. The method of claim 2, wherein detecting a change from the first set of load conditions associated with the power supply line to the second set of load conditions comprises determining that the radio frequency circuit in the user device is operating in a second radio frequency band higher than the first radio frequency band.

4. An apparatus comprising:
   a power supply;
   a storage device to store a plurality of capacitance values;
   a power sink coupled to the power supply over a power supply line;
   a tunable decoupling capacitor coupled to the power supply line between the power supply and the power sink; and
   a processing device coupled to the tunable decoupling capacitor and to the power sink, the processing device to:
      determine a first capacitance value corresponding to a first set of load conditions associated with the power supply line;
      determine a second capacitance value corresponding to a second set of load conditions associated with the power supply line;
      detect a first level of electromagnetic interference on the power supply line;
      determine that the first level of electromagnetic interference is above a threshold level;
      detect occurrence of the first set of load conditions associated with the power supply line;
      set the tunable decoupling capacitor on the power supply line to the first capacitance value to reduce the first level of electromagnetic interference on the power supply line to a second level of electromagnetic interference lower than the first level;
      detect a change from the first set of load conditions associated with the power supply line to the second set of load conditions; and
      set, by the processing device, the tunable decoupling capacitor on the power supply line to the second capacitance value to reduce the first level of electromagnetic interference on the power supply line to a third level of electromagnetic interference lower than the first level.

5. The apparatus of claim 4, wherein the power sink comprises a radio frequency circuit, and wherein to detect occurrence of the first set of load conditions associated with the power supply line, the processing device to determine that the radio frequency circuit is operating in a first radio frequency band.

6. The apparatus of claim 5, wherein to detect a change from the first set of load conditions associated with the power supply line to the second set of load conditions, the processing device to determine that the radio frequency circuit is operating in a second radio frequency band higher than the first radio frequency band.

* * * * *